(12) United States Patent
Helmecke et al.

(10) Patent No.: US 7,624,212 B2
(45) Date of Patent: Nov. 24, 2009

(54) CONTROL OF A PERIPHERAL APPARATUS VIA A CANOPEN INTERFACE

(75) Inventors: Sven Helmecke, Möhrendorf (DE); Bernd Kalnischkies, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 112 days.

(21) Appl. No.: 11/959,582

(22) Filed: Dec. 19, 2007

(65) Prior Publication Data
US 2008/0155144 A1 Jun. 26, 2008

(30) Foreign Application Priority Data
Dec. 19, 2006 (DE) .................. 10 2006 060 071

(51) Int. Cl.
*G06F 13/12* (2006.01)
*G06F 13/00* (2006.01)

(52) U.S. Cl. ................ 710/72; 710/15; 710/62; 705/59

(58) Field of Classification Search .......... 710/8, 710/15–19, 62–64; 719/315–316; 717/174; 705/59

See application file for complete search history.

(56) References Cited

U.S. PATENT DOCUMENTS

| 6,105,069 A | 8/2000 | Franklin et al. |
| 6,581,117 B1 | 6/2003 | Klein et al. |
| 7,216,108 B2 * | 5/2007 | Hastings et al. ............ 705/63 |
| 7,464,384 B2 * | 12/2008 | DeNatale ............... 719/316 |
| 2006/0230397 A1* | 10/2006 | Cook et al. ............. 717/174 |
| 2008/0234046 A1* | 9/2008 | Kinsley ................. 463/40 |
| 2009/0019454 A1* | 1/2009 | DeNatale ............... 719/315 |

FOREIGN PATENT DOCUMENTS

DE  10 2005 002 472 A1  7/2006

* cited by examiner

Primary Examiner—Christopher B Shin
(74) Attorney, Agent, or Firm—Schiff Hardin LLP

(57) ABSTRACT

In a method for controlling peripheral apparatuses, as well as a correspondingly fashioned peripheral apparatus and an apparatus that is fashioned for use with peripheral apparatuses, as well as in a system, an object registry of a known CANopen interface is augmented by at least one license object through which the peripheral apparatus is controlled and in which control data for controlling the peripheral apparatus are stored and/or administered. A mechanism for access to a license object is provided.

12 Claims, 3 Drawing Sheets

CONTROL OF A PERIPHERAL APPARATUS VIA A CANOPEN INTERFACE

BACKGROUND OF THE INVENTION

1. Field of the Invention

The present invention is in the fields of data processing and medical technology and in particular concerns a method for controlling peripheral apparatuses in a medical technology environment; correspondingly fashioned medical technology apparatuses and peripheral apparatuses, and a system that is fashioned for communication with the participating apparatuses.

2. Description of the Prior Art

In large medical systems it is known that the respective large apparatuses (for example, computed tomography, apparatuses, angiography apparatuses, ultrasound apparatuses, positron emission tomography apparatuses, single photon emission computed tomography apparatuses etc.) are not used as a single unit, but rather frequently are operated together with other (often smaller) apparatuses. This modular design entails some advantages including more flexible usage possibilities for the respective large system. These smaller apparatuses frequently also are designated as peripheral apparatuses, since they are arranged in the periphery around the respective large apparatus. For example, peripheral apparatuses can be injectors, respiration apparatuses, EKG monitors, gradient amplifiers or detection apparatuses for respiration gating.

A specific protocol or communication interface is necessary for the operation of the entire system and with regard to communication between the individual modules.

A CANopen interface that is based on the CAN standard and is a layer 7 communication protocol is known in particular from the field of automation technology.

In principle different basic services are defined in the CANopen standard. Among other things, these are: Request, Indication, Response and Communication. Moreover, different communication objects are defined such as, for example, a service object, a process data object and a network management object. Moreover, an object registry is provided in the standard, in which object registry all relevant data of a CANopen apparatus are stored in a tabular data structure. The object registry includes all apparatus parameters and all current process data. In principle all communication objects and all user objects are centralized in the object registry. The object registry is typically sub-divided into different regions. General specifications about the apparatus (such as, for example, an apparatus identification (ID), a manufacturer name and further communication parameters) are stored in a first region. Specific apparatus functionalities are described in a further section. The entries of the object registry are typically identifiable or accessible via a 16-bit index. In principle, relevant parameters of the apparatus (such as, for example, input and output signals, apparatus parameters, apparatus function or other parameters) are made accessible for further instances via the entries in the object registry.

If the CANopen standard were now applied to medical technology without modification, a problem would be the lack of flexibility in the feature-dependent control of the peripheral apparatuses, since previously a host-based software module had to be used in order to read out or make accessible hardware information (such as, for example, the vendor ID, the serial number and the device name) relevant for the apparatus control. A "host-based software module" means a software module that is associated with the bus master. If an arbitrary peripheral apparatus were attempted to be specifically and selectively controlled by an external instance via the CANopen interface, in the prior art this was previously possible only in a very limited manner via the bus master, if at all. Moreover, a more flexible control possibility for the respective peripheral apparatus was also not provided. For example, it has not been possible to adaptively control specific features of the peripheral apparatus and thus to activate or to deactivate a peripheral apparatus depending on the application case. It has also not been possible to set the scope in which a particular peripheral apparatus should be used (for example only for a limited number of test purposes, or only in a specific host system).

SUMMARY OF THE INVENTION

An object of the present invention is to provide control of a CANopen peripheral apparatus that should be operated with other apparatuses, in particular to be able to more flexibly design the control.

In the following the invention is described using the solution according to the method. Advantages, features or alternative embodiments are likewise to be applicable to other inventive subject matter, in particular to a system, a software product, an apparatus and a peripheral apparatus.

The above object is achieved in accordance with the invention by a method for controlling at least one peripheral apparatus that is operated together with at least one medical technology apparatus, wherein the communication ensues via a CANopen interface, and wherein an object registry of the CANopen interface is extended (augmented) by at least one license object with which the peripheral apparatus is activated, and in which control data for controlling the peripheral apparatus are stored, and wherein a mechanism for access to the license object is provided.

The terms "control" and "activate" as used herein encompass all measures and actions that should be executed in regard to and in connection with the peripheral apparatus, such as, for example, an initialization, a boot-up, a start-up to a full or limited extent, a monitoring, a start-up or use of the peripheral apparatus under specific conditions or parameters, and also encompass a query of data that concern the peripheral apparatus and are stored therein (for example manufacturer ID, serial number, apparatus name etc.). The inventive control thus encompasses a data exchange from an external instance to the peripheral apparatus as well as a data exchange from the peripheral apparatus to an external instance in order, for example, to execute monitoring measures with regard to the peripheral apparatus. Monitoring of whether a preceding activation action has been correctly executed is likewise encompassed. In other words, the control includes a bidirectional data exchange with regard to the peripheral apparatus or the apparatus.

The "apparatus" is in particular a large medical technology apparatus such as, for example, a computed tomography apparatus, an angiography apparatus, an ultrasound apparatus, a positron emission tomography apparatus, a single photon computer tomography apparatus, etc. These large apparatuses typically are operated with additional modules that can also be designated as peripheral apparatuses. Peripheral apparatuses can be, for example, injectors, detection apparatuses for respiration gating, respiration apparatuses, EKG monitors, dosimeters, internal or external operating consoles, internal or external foot switches, displays, anesthesia units, pulse oxymeters, etc. The peripheral apparatuses are connected to the large apparatus and exchange data via a suitable interface. The interface can be designed differently between the individual peripheral apparatuses and the apparatus. Here it can be a standardized or proprietary interface. It is in particular a CANopen interface. The peripheral apparatus and/or the apparatus thus can also be addressed by an external source (from the outside) via the respective interface. Moreover, further interfaces with other instances can also be provided. Alternative embodiments are not for the application of the present invention in the field of medical technology, but rather in other fields of technology, for example in automation or process engineering. The apparatus is correspondingly a system in the respective field of the technology (for example process engineering) and the peripheral apparatuses are likewise modules that are used in that context. The primary application of the present invention, however, is in the field of medical technology and thus concerns the examples of peripheral apparatuses (injector, gradient amplifier etc.) described above.

In addition to the reliability, effectiveness and flexibility, the CANopen communication protocol also offers the advantage of low hardware cost. CANopen has a synchronization mechanism that is based on a cyclical transfer of synchronization messages. The access is based on a bus system. Apparatuses (or peripheral apparatuses) are typically used that support the profile DS301 or (in the specific case of the injector) the DSP 425 profile. However, to those skilled in the art it is apparent that any other profiles or standards can be used that are based on a fundamental CANopen functionality.

The inventive solution extends the CANopen interface by a license object without department from the standard of CAN and/or CANopen. The license object is integrated into the object registry of the respective CANopen peripheral apparatus. Control data are stored in the license object, by means of which control data the peripheral apparatus can be controlled. Moreover, the license object is also designed to administer the control data in the license object. In order to be able to ensure data exchange with the control data of the license object, a mechanism is provided for access to the license object. It is thereby possible for an external or internal instance to access the license object, in particular the control data of the license object, in order to modify, expand or delete the data.

The license object is typically integrated into a manufacturer-specific object region of the object registry. Information about the usability or employability of individual features of an apparatus can be administered with the license object.

In principle the inventively provided mechanism for access embodies all access types and in particular provides write access and read access. With the write access it is possible to alter usage information with regard to the peripheral apparatus even after the sale or during the initial operation of the apparatus. In other words, it is possible to sell an additional feature of the peripheral apparatus or to equip the peripheral apparatus with an additional component, even when the peripheral apparatus is already in use. Given a read access, data or items of information that are relevant in for the use of the peripheral apparatus, can be queried in a simple manner. For example, it is possible to establish in a simple manner whether the making or using a copy of an exchangeable CANopen apparatus (for example an injector) is approved for the respective host system (thus the respective system). Moreover, further control and monitoring measures can also be executed. Further access types that, for example, provide a delete access or a changing write access are comprised in alternative embodiments. A basic advantage of the inventive access mechanism is that features can also be subsequently sold and/or enabled in already-sold hardware. Moreover, different monitoring parameters can be queried in regard to the peripheral apparatus. For example, it is thus possible to monitor license information with regard to the peripheral apparatus (Is the respective peripheral apparatus licensed at all for the current use? Is there a test license? Has the license already expired? To what extent does the license exist for the peripheral apparatus?).

The control information (in particular the license information) that are associated with a peripheral apparatus, and that are or can be relevant for controlling the same, are reproduced in hardware. The control data of the license object are typically stored in a non-volatile memory (flash memory, EEPROM, ROM etc.). After the start-up of the apparatus or of the peripheral apparatus the control data are automatically loaded, read or initialized from the memory. It is thereby possible to always use the current control data. For example, if the control data were altered by a write access (for example, because a new feature has been released), after a reset of the peripheral apparatus the new control data are automatically read, such that the new feature can be enabled at the next [nearest] possible point in time. In an alternative embodiment, the control data of the license object or the license object can be stored on a mobile data medium that enables a flexible communication with external data units or data processing apparatuses.

The control data can be related to the peripheral apparatus, and in particular can concern activation and/or deactivation of features. The features can be additional features or existing extended or otherwise altered features. The features can be realized with regard to their functionality by structural modules or sub-apparatuses or by software modules. It is thus possible to modify the usage conditions for the peripheral apparatus (duration of the operating time/service life, use for a number of host systems, or for one specific host system etc.), the currently available modules or the license modules, or the enabled features, via the license object, even after start-up of a respective peripheral apparatus. In particular these features can be activatable, deactivateable and/or enabled. The operation of the entire system and in particular of the peripheral apparatuses thus can be adapted significantly more flexibly and dynamically to the particular application case. Moreover, the use of unlicensed modules or features (which would lead to safety risks) can be safely precluded.

It is possible to implement a check that can already be executed either before the use of a peripheral apparatus or even during the start-up thereof. This allows monitoring as to whether the use of the peripheral apparatus in the respective host system is allowed under the applicable operating conditions, or whether the use of the current features of the peripheral apparatus is licensed.

In a further preferred embodiment of the invention, the activation of the peripheral apparatus ensues based on an adherence to specific operating conditions. The operating conditions can concern the peripheral apparatus, the apparatus, sub-apparatuses or parts, individual features or modules thereof encompass all possible conditions that can be relevant with regard to the operation of the apparatus, for example, test licenses that enable the use of a peripheral apparatus only for a specific, pre-defined number of sessions. Moreover, the operating condition can be set so that the use of, for example, a specific injector is limited only to a specific host system, or alternatively that it is allowed to connect an injector to different host systems. In this case the license object with regard to the particular peripheral apparatus is executed as a field (array) and includes a number of entries that represent license information about the use of the peripheral apparatus in the respective host system. These measures can be monitored with the inventive checking mechanism so that, for example, the use of the respective injector in an unknown host system is blocked and therefore safely precluded. Moreover, it can be set that the respective peripheral apparatus can be used only for a specific application case. This can also be monitored via the license object. An "expiration date" for the use of the peripheral apparatus can also be defined and monitored. The preceding enumeration of the possible operating conditions to be monitored can be altered at any time and, as is apparent to those skilled in the art, can be dynamically designed for the respective application case. The respective operating conditions can be defined, changed and/or monitored via the license object.

The customer or the host system of the customer communicates with the respective peripheral apparatus via a CANopen bus. In order to increase the security of the system, hardware or software dongles can be used that provide a copy protection for the respective module. Such dongles that use a public key and a secure tunnel from the driver to the dongle can in particular be used for this purpose.

It is necessary for the manufacturer (of the peripheral apparatus) to execute access to the license object such that is accomplished by this a special interface.

The control data stored in the license object can be administered internally or via an external source. This includes storage, processing, application (initialization), deletion or other modification measures with regard to the control data. The administration procedure is typically initiated by the manufacturer or by the customer of the peripheral apparatus.

A storage medium that is designed for storage of programming instructions for the computer-implemented method described above, that can be read by a computer.

DESCRIPTION OF THE PREFERRED EMBODIMENTS

The invention concerns the control of peripherals apparatuses PG that are operated together with an apparatus G. The primary application of the present invention lies in the field of medical technology, such that the apparatuses G are typically large medical apparatuses such as SPECT apparatuses, PET apparatuses or CT apparatuses. Injectors, displays, EKG monitors etc., are used as peripheral apparatuses PG.

Figure 1:
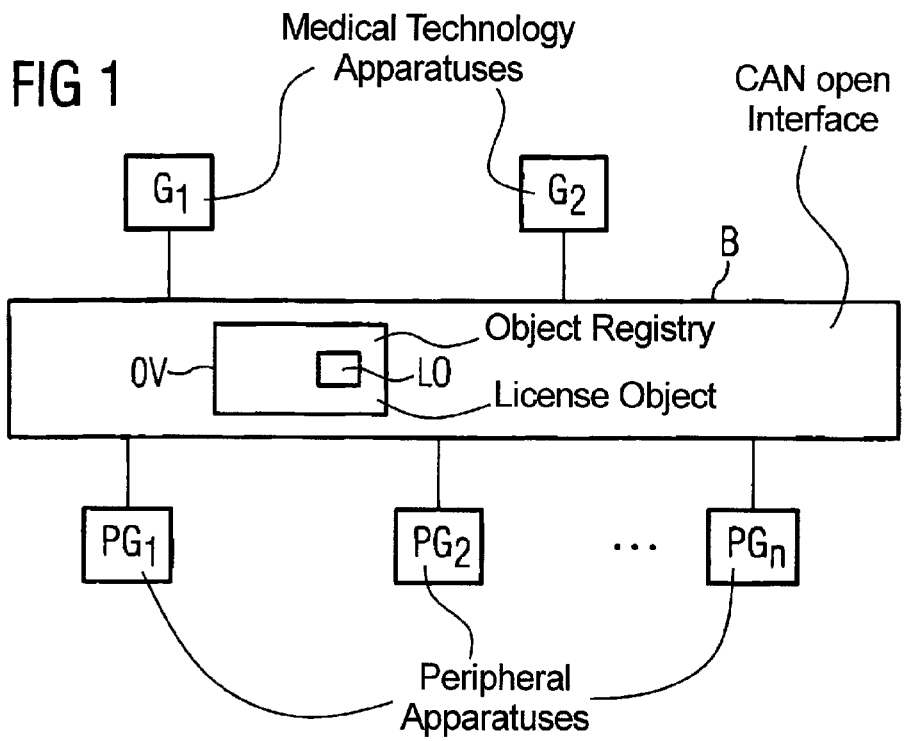
FIG. 1 is a block diagram overview of a medical technology system with a corresponding communication structure in accordance with the invention.

As shown in FIG. 1, the apparatuses G, the peripheral apparatuses PG and possible additional external instances communicate with one another via a CANopen bus.

The CANopen interface B is inventively modified. An object registry OV of the CANopen interface is augmented by a license object LO. Control data that are designed for controlling the peripheral apparatus PG are stored in the license object LO. In the preferred embodiment license object LO comprises a license string. The license object LO can in principle be implemented at every CANopen peripheral apparatus or module.

Figure 2:
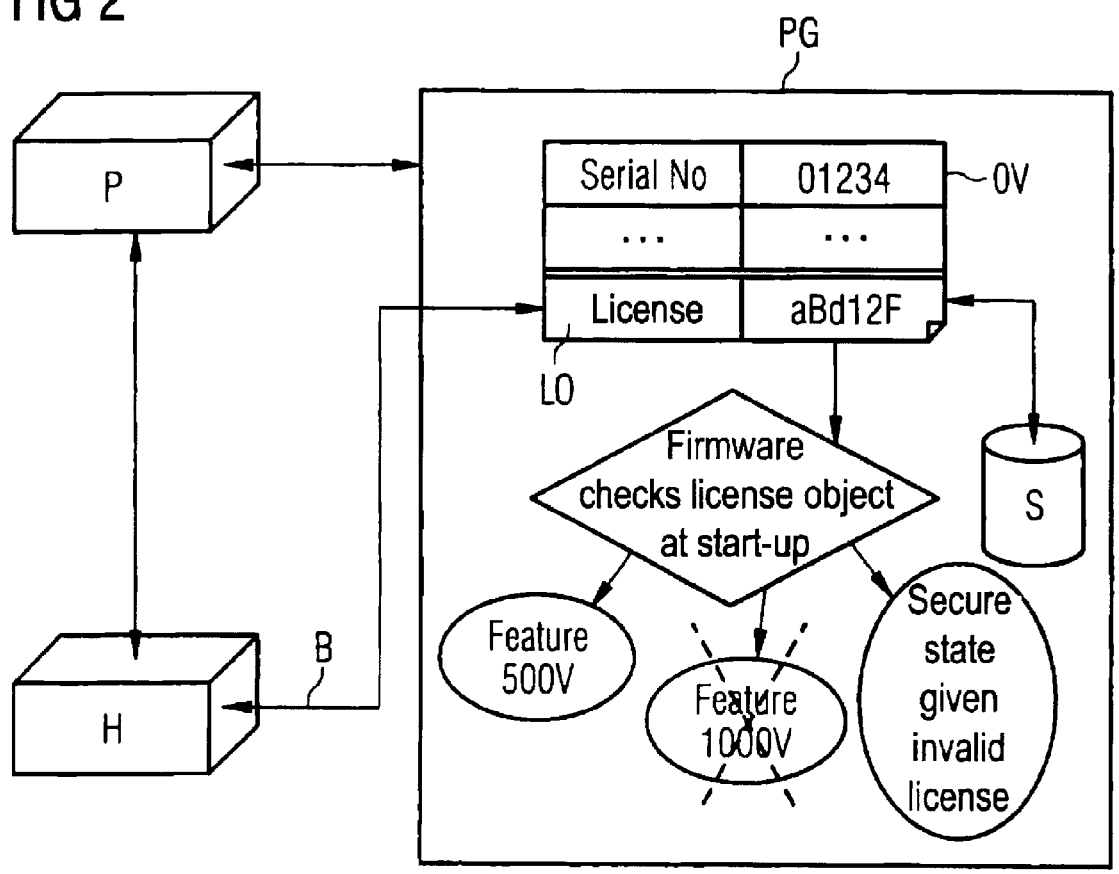
FIG. 2 is an overview representation of a peripheral apparatus that is fashioned with functional dependencies for communication with a manufacturer and a host system of a customer.

The fundamental communication structures of the inventive solution are shown in FIG. 2. A peripheral apparatus PG is equipped with an object registry OV extended by the license object LO. The data of the license object LO are stored in a non-volatile memory S, in particular in a flash memory S. The peripheral apparatus PG communicates with a host system H of the customer via the CANopen bus B. Moreover, the peripheral apparatus PG can communicate with a manufacturer (producer). The latter typically ensues via a proprietary interface. In an alternative embodiment, the communication between the manufacturer P and the respective peripheral apparatus PG also ensues via the CANopen bus B. Moreover, an interface between the host system of the customer H and the manufacturer P is provided for exchange of data, in particular of license object-related data.

The license object LO is thus embedded or integrated into the object registry OV of the previous CANopen interface B. License information that is associated with a CANopen-controllable peripheral apparatus PG can therewith be reproduced in hardware in that the data are written into a flash memory S and can be read out from there.

According to the invention, an access mechanism to the license object LO is provided. A write access and a read access to the corresponding data of the license object LO are in particular possible.

The underlying workflow is explained briefly in the following in connection with FIG. 2.

As schematically shown in FIG. 2, a further element (the license object LO) is attached to the previous object registry OV. This is indicated in FIG. 2 by the double solid line below the previous entries in the object registry OV. Here the license "aBd12F" is entered. The content of the license object LO is stored in the memory S. After an activation or after the reset of the peripheral apparatus PG, CANopen firmware that is present at the respective apparatus PG checks the content of the license object LO. Depending on whether the value defined there matches the hardware identification (for example the serial number of the peripheral apparatus PG), the start-up of the apparatus can be continued normally. Otherwise the peripheral apparatus PG automatically transitions to a secure state that allows no normal operation of the apparatus PG and only allows the writing of a license key. This is represented in FIG. 2 by the oval shown on the right side.

After the preceding check has been successfully executed and it has been established that the key matches the hardware, a check is made as to which features are allowed in the current application case. In principle all features or modules that can be of importance in connection with the respective peripheral apparatus PG can be checked here. In the example presented in FIG. 2 only the feature "500V" is allowable while the feature "1000V" is not allowed. After this check the peripheral apparatus or, respectively, the respective component PG is in its operating mode.

Via the inventive extension of the object registry OV with the license object LO it is possible to also activate further or, respectively, additional features retroactively, thus during the start-up of a peripheral apparatus PG. For this the customer or, respectively, the host system H of the customer reads out the hardware identification by means of corresponding object registry entries and sends these to the manufacturer P. The manufacturer P generates the matching key with the new features. The host system H of the customer can thereupon enter the value into the license object LO via the CANopen interface B and it can store this entry on the flash S. This can be executed, for example, via the CANopen save mechanism of the DS301 profile.

Moreover, operating conditions can be checked via the implementation of the license object LO. The firmware, for example, can store the number of the previously conducted starts in the flash memory S and, given a license check, the firmware can check whether a further start of the peripheral apparatus PG is allowed or not. The respective result of the firmware check leads to a different state of the system. The respective feature is activated given a successful check and the respective feature is deactivated given an unsuccessful check. This is exemplarily presented in FIG. 2 in that the allowed feature "500V" is not crossed out while the further feature "1000V" is crossed out. This should indicate that this check is executed dynamically and relates to the respective application case. For example, it is possible that this feature "1000V" is available again and is activated in another host system H or given an altered license object LO.

In the event that the customer would like to purchase a new feature and this process has been successfully executed at the manufacturer, the respective feature is thus available as an activatable feature at the next start-up of the respective component PG.

Figure 3:
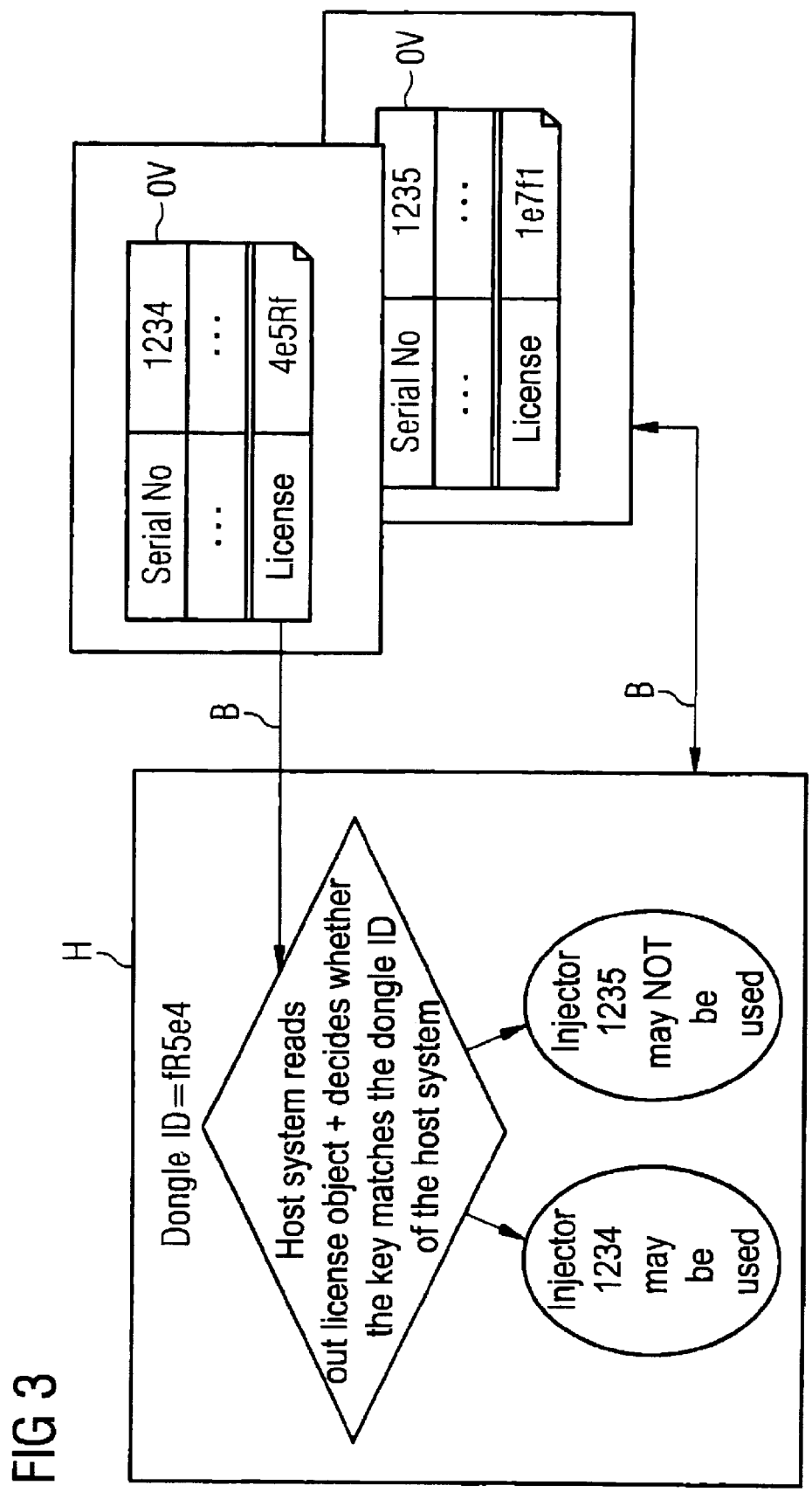
FIG. 3 is an overview representation of inventively fashioned object registries that are considered in a host system of a customer

A read access should be described in connection with FIG. 3 in the example of the injector peripheral apparatus PG. It should be mentioned that a special CANopen profile (the DPS425 profile) is provided for injectors. In principle all CANopen injectors behave identically at the interface, i.e. at the bus B. Injectors are typically implemented as plug-and-play components. Due to this, and due to the non-differentiable behavior at the bus B, the necessity arises that, given integration of a new injector into the previous system, a check must in principle be executed as to whether its use is also allowed. In the previous systems from the prior art, such a check required a plurality of very complicated queries. This procedure can advantageously be significantly simplified using the license object LO.

Through the extension of the object registry OV by the license object LO it is possible to bind a specific injector PG to a specific system. In the event that it is necessary, it can be precluded that this injector PG is used at another system. Moreover, protection against the use of third-party vendor injectors can also be provided.

With a special program interface to the defined, the manufacturer P has the possibility to describe the license object LO with a valid value matching the host system H. The manufacturer system P thus executes a write access to the license object LO of the peripheral component PG. In the example presented in FIG. 3, for example, it enters the license "4e5Rf" into the license object LO. For security reasons, a transformation "dongle identification–> valid license key" ensues. In FIG. 3 this transformation is exemplarily represented via presentation of the reversed character sequence. The original character sequence "4e5Rf" corresponds to the dongle identification number "fR5e4". The host system thus reads out the license object LO and decides whether the respectively read key matches the dongle identification of the host system. In FIG. 3 the single allowable dongle identification is the string "fR5e4". The injector hereby associated (in this case injector 1234) may therefore be used while the other injector 1235 may not be used.

Figure 4:
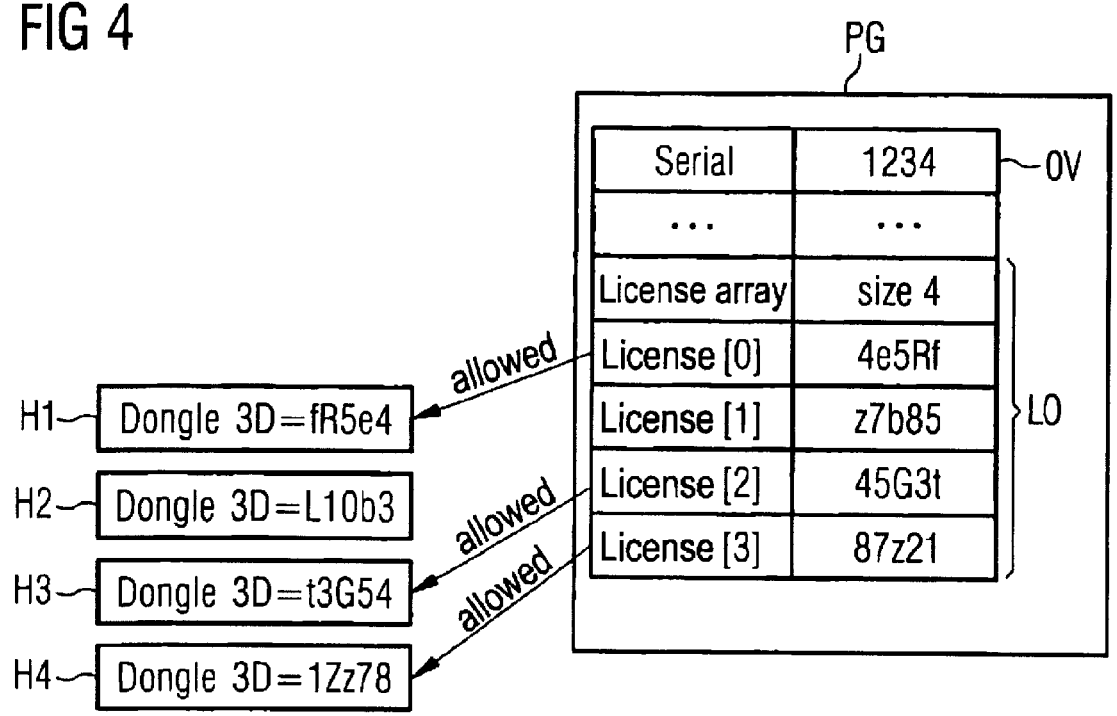
FIG. 4 is an overview representation of a peripheral apparatus with inventively fashioned object registry, which peripheral apparatus communicates with various host systems.

FIG. 4 it is schematically shows that it is also possible to depict a scenario in which one and the same injector should be used at a plurality of host systems S. However, the usability is limited in that the injector should be used only at a maximum of four host systems. In this case the license object is fashioned as a field data structure. This is exemplarily shown in FIG. 4. The object registry OV is inventively extended by the license object LO, which is fashioned as an array. In this case the array has four entries so that up to four possible host systems can be allowed. After evaluation of the respective rule for the key generation, the respective injector PG is allowed or not at the host system H. As mentioned in the preceding, in the examples presented in figures the rule is represented by the reversal of the order of the characters of the dongle identification for reasons of simple intelligibility. It should be noted that in real use rules known to those skilled in the art can be used. In the example shown in FIG. 4 the first injector is allowed at the first host system H1 while the second injector is not allowed and the third and fourth injectors are allowed at the host system H3 and at the host system H4.

In other words, the license file LO inventively and for security reasons comprises an association rule that associates the content of the injector-side (or, respectively, peripheral apparatus-side) license object LO with a unique host identifier (for example MAC address or a dongle identification). Further application cases can be realized with this association rule (key). For example, it is thus possible to further limit the usage of an injector PG with respective license object LO. In the preferred embodiment the key of the license object LO is introduced into the CANopen object registry OV in a production step or via a specific service interface to be defined. Furthermore, the key operating system derived from a unique identifier from the host H of the system (for example, the dongle identification or a MAC address).

By means of the license object LO it is possible to depict different application scenarios. For example, an "expiry date" can be implemented that indicates how long the respective module of the peripheral apparatus or, respectively, the peripheral apparatus PG can be used. Furthermore, the license object LO can also be used to purchase a further license after expiration of the previously granted license. Moreover, it is possible to automatically remember maintenance intervals for the peripheral apparatus PG. A country information can also be integrated into the host-side license file LO in order to allow or bar the injector operation dependent on the country settings made at the host H, since different countries provide different operating conditions for the respective peripheral apparatuses PG in part.

A further advantage of the inventive solution is that the inventive license object LO in principle can be implemented in any CANopen peripheral apparatus. For example, it is thus also possible to variably control a CANopen motor, whereby the motor drives a patient bed, and thus the movement path for the patient bed can be limited or, respectively, modified. It is thus possible for the loading software or firmware running on the respective peripheral apparatus PG to treat incoming commands differently depending on the respective value of the license object LO. For example, given a command that reads out the maximum movement path, the patient bed motor module could thus return the value "120" (for a basic license) and "160" (for a whole-body license) dependent on the content of the license object LO.

The invention can be realized in part or entirely by software and/or hardware and/or distributed among a number of physical products (in particular computer program products).

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for controlling at least one peripheral apparatus that is operated together with at least one medical technology apparatus, comprising the steps of:
   operating at least one peripheral apparatus together with at least one medical technology apparatus and, at least while said at least one peripheral apparatus is operated together with said at least one medical technology apparatus, communicating between said at least one peripheral apparatus and said at least one medical technology apparatus via a CANopen interface having an object registry;

augmenting said object registry of said CANopen interface by at least one license object that controls the peripheral apparatus and, in said at least one license object, storing at least one of data for controlling the peripheral apparatus and data for administering the peripheral apparatus; and providing a mechanism allowing access of said license object.

2. A method as claimed in claim 1 comprising storing said data or said license object in a non-volatile memory, and automatically reading data of said license object after resetting either the peripheral apparatus or the medical technology apparatus.

3. A method as claimed in claim 1 comprising selecting said mechanism for access to said license object from the group consisting of write access and read access.

4. A method as claimed in claim 1 comprising selecting said data in said license object from the group consisting of data that activate at least one feature of the peripheral apparatus and data that deactivate at least one feature of the peripheral apparatus.

5. A method as claimed in claim 4 comprising allowing at least one further entity to be activated and enabled by said license object, said at least one further entity being selected from the group consisting of at least one module of the peripheral apparatus and at least one feature of the peripheral apparatus.

6. A method as claimed in claim 4 comprising before using said peripheral apparatus or said at least one feature of said peripheral apparatus, automatically checking whether use of the peripheral apparatus or said at least one feature of said peripheral apparatus is implemented by said license object.

7. A method as claimed in claim 1 comprising allowing operation of said at least one peripheral apparatus with a plurality of medical technology apparatuses via said license object, by executing said license object as a field.

8. A method as claimed in claim 1 comprising, via said data in said license object, causing operating conditions for operating said peripheral apparatus to be defined or modified.

9. A peripheral apparatus that is operated together with at least one medical technology apparatus, comprising:

a control unit that operates said peripheral apparatus together with at least one medical technology apparatus that, at least while said at least one peripheral apparatus is operated together with said at least one medical technology apparatus, communicates between said peripheral apparatus and said at least one medical technology apparatus via a CANopen interface having an object registry;

said object registry of said CANopen interface being augmented by at least one license object that controls the peripheral apparatus and said control unit storing at least one of data for controlling the peripheral apparatus and data for administering the peripheral apparatus in said at least one license object; and a mechanism allowing access of said license object.

10. A medical technology apparatus that is operated together with at least one peripheral apparatus, comprising:

a control unit that operates said medical technology apparatus together with at least one peripheral apparatus that, at least while said at least one peripheral apparatus is operated together with said medical technology apparatus, communicates between said at least one peripheral apparatus and said medical technology apparatus via a CANopen interface having an object registry;

said object registry of said CANopen interface being augmented by at least one license object that controls the peripheral apparatus and said control unit storing at least one of data for controlling the peripheral apparatus and data for administering the peripheral apparatus in said at least one license object; and a mechanism allowing access of said license object.

11. A medical system comprising:

at least one peripheral apparatus that is operated together with at least one medical technology apparatus, a control unit that operates said at least one peripheral apparatus together with said at least one medical technology apparatus that, at least while said at least one peripheral apparatus is operated together with said at least one medical technology apparatus, communicates between said at least one peripheral apparatus and said at least one medical technology apparatus via a CANopen interface having an object registry;

said object registry of said CANopen interface being augmented by at least one license object that controls the peripheral apparatus and said control unit storing at least one of data for controlling the peripheral apparatus and data for administering the peripheral apparatus in said at least one license object; and a mechanism allowing access of said license object.

12. A computer-readable medium encoded with programming instructions, said programming instruction, when said medium is loaded into a control unit that controls at least one peripheral apparatus that is operated together with at least one medical technology apparatus, causing the control unit to:

operate said at least one peripheral apparatus together with said at least one medical technology apparatus and, at least while said at least one peripheral apparatus is operated together with said at least one medical technology apparatus, communicate between said at least one peripheral apparatus and said at least one medical technology apparatus via a CANopen interface having an object registry, said object registry of said CANopen interface being augmented by at least one license object that controls the peripheral apparatus and, in said at, least one license object;

store at least one of data for controlling the peripheral apparatus and data for administering the peripheral apparatus; and allow access of said license object.

* * * * *